United States Patent
Hao et al.

(10) Patent No.: US 10,036,359 B2
(45) Date of Patent: Jul. 31, 2018

(54) HYBRID VEHICLE ENGINE STARTER CONTROL SYSTEMS AND METHODS

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 15/159,058

(22) Filed: May 19, 2016

(65) Prior Publication Data

US 2017/0335816 A1    Nov. 23, 2017

(51) Int. Cl.
| | |
|---|---|
| F02N 11/08 | (2006.01) |
| B60K 6/48 | (2007.10) |
| B60L 11/18 | (2006.01) |
| F02N 11/04 | (2006.01) |

(52) U.S. Cl.
CPC ............... *F02N 11/08* (2013.01); *B60K 6/48* (2013.01); *B60L 11/1803* (2013.01); *B60L 11/1851* (2013.01); *F02N 11/04* (2013.01); *F02N 2200/041* (2013.01); *F02N 2300/106* (2013.01); *F02N 2300/20* (2013.01)

(58) Field of Classification Search
CPC .... F02N 11/08; F02N 11/04; F02N 2200/041; F02N 2300/20; F02N 2300/106; B60L 11/1851; B60L 11/1803; B60K 6/48
See application file for complete search history.

(56) References Cited

U.S. PATENT DOCUMENTS

| | | | |
|---|---|---|---|
| 7,436,139 B2 | 10/2008 | Maslov et al. | |
| 2017/0334427 A1* | 11/2017 | Butcher | B60K 6/48 |

FOREIGN PATENT DOCUMENTS

| | | |
|---|---|---|
| CN | 2711983 Y | 7/2005 |
| EP | 0619427 B1 | 10/1994 |
| JP | 2000104650 A | 4/2000 |

OTHER PUBLICATIONS

J.S. Lawler et al., "Limitations of the Conventional Phase Advance Method for Constant Power Operation of the Brushless DC Motor," Oak Ridge National Laboratory, pp. 1-11.
Bilal Akin et al. "Trapezoidal Control of Bldg Motors Using Hall Effect Sensors," Texas Instruments Application Report, Jul. 2013, pp. 1-35.
Quanbao Zhou, John Houldcroft, "Cold engine cranking torque requirement analysis," SAE International Inc., 2007, JSAE 20077002.

* cited by examiner

*Primary Examiner* — Yuen H Wong
(74) *Attorney, Agent, or Firm* — Quinn IP Law (57) ABSTRACT

A vehicle propulsion system includes an engine and a first electric machine each configured to selectively provide torque to propel the vehicle. The propulsion system also includes a second electric machine coupled to the engine and configured to start the engine from an inactive state. A controller is programmed to execute a first control algorithm while output speed of the second electric machine is less than a first speed threshold. The controller is also programmed to execute a second control algorithm while output speed of the second electric machine is greater than the first speed threshold and less than a second speed threshold.

6 Claims, 7 Drawing Sheets

HYBRID VEHICLE ENGINE STARTER CONTROL SYSTEMS AND METHODS

TECHNICAL FIELD

The present disclosure relates to hybrid vehicle propulsion system engine starters and control methods.

INTRODUCTION

Combustion engines may have an electric starter coupled to the engine to turn a crankshaft leading up to a start event. The electric starter can be an electric motor having contact brushes to conduct current between stationary wires on a stator portion and moving parts of a rotor portion. The physical contacts may wear over time leading to motor degradation. Additionally, a brushed motor delivers substantially zero torque near the upper bound of its available speed range.

SUMMARY

A vehicle propulsion system includes an engine and a first electric machine each configured to selectively provide torque to propel the vehicle. The propulsion system also includes a second electric machine coupled to the engine and configured to start the engine from an inactive state. A controller is programmed to execute a first control algorithm while output speed of the second electric machine is less than a first speed threshold. The controller is also programmed to execute a second control algorithm while output speed of the second electric machine is greater than the first speed threshold and less than a second speed threshold.

The controller may also be further programmed to execute a third control algorithm while output speed of the second electric machine is greater than the second speed threshold.

The first control algorithm may include operating the second electric machine using trapezoidal current control with pulse width modulation.

The second control algorithm may include operating the second electric machine using six-step voltage control with a variable phase advance angle.

The third control algorithm may include operating the second electric machine using six-step voltage control with a predetermined fixed phase advance angle.

A method of controlling an electric machine includes operating the electric machine using a trapezoidal current control algorithm in response to operation in a first output speed range. The method also includes operating the electric machine using a six-step voltage control algorithm with a variable phase advance angle in response to operation in a second output speed range. The method further includes operating the electric machine using a six-step voltage control algorithm with a predetermined fixed phase advance angle in response to operation in a third output speed range.

A vehicle propulsion system includes an engine and a first electric machine each configured to selectively provide torque to propel the vehicle. The propulsion system also includes a second electric machine coupled to the engine and configured to start the engine from an inactive state. A controller is programmed to select an operation algorithm for the second electric machine based on at least output speed. The controller is also programmed to operate the second electric machine using a first predetermined phase advance angle for input current while the second electric machine is operated in a first output speed range. The controller is further programmed to operate the second electric machine using a variable phase advance angle for phase voltage based on a speed demand and a torque demand while the second electric machine is operated in a second output speed range.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
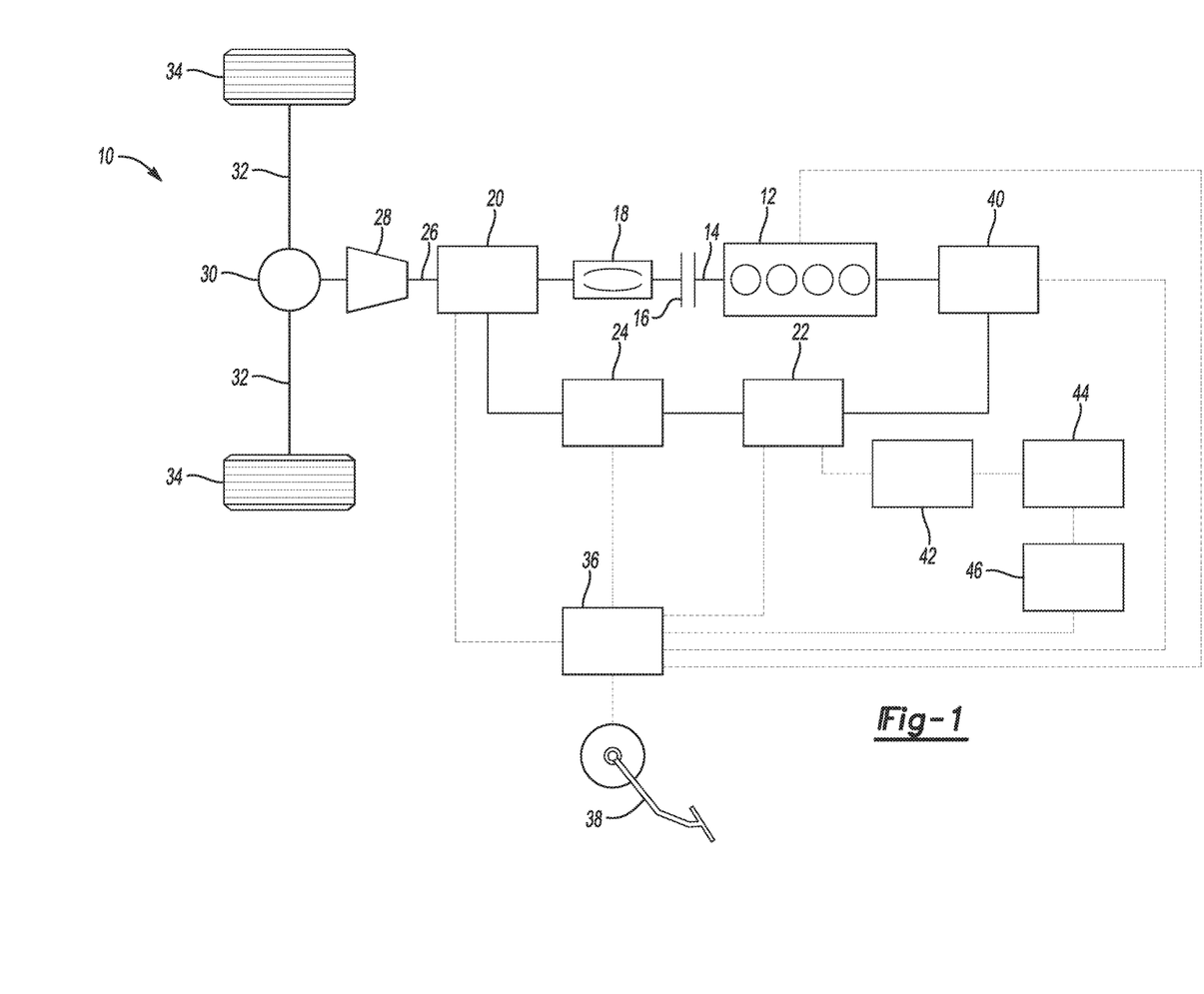
FIG. 1 is a system schematic of a hybrid vehicle propulsion system.

Referring to FIG. 1, a vehicle 10 is provided. By way of example, vehicle 10 is a hybrid electric vehicle (HEV) having a powertrain with both a petrol propulsion source and an electric propulsion source. Either or both of the propulsion sources may be selectively activated to provide propulsion based on the vehicle operating conditions. Internal combustion engine 12 operates as the petrol propulsion source and outputs torque to a shaft 14. The engine 12 may have a plurality of cylinders to generate power from the combustion of a fuel to cause rotation of the shaft 14. One or more decoupling mechanisms may be included along shaft 14 in order to decouple output of engine 12 from the remaining portions of the powertrain. A clutch 16 is provided to allow selection of a partial or complete torque decoupling of the engine 12. In one example clutch 16 is a friction clutch having a plurality of friction plates which are at least partially engaged when the clutch is closed to transfer torque, and disengaged when the clutch is opened to isolate torque flow between the downstream portions of the powertrain and the engine 12.

A torque converter 18 may also be included to provide a fluid coupling between the output portion of engine 12 and downstream portions of the driveline. The torque converter 18 operates to smoothly ramp up torque transfer passed from the engine to the driveline. Also, the torque converter allows a decoupling such that the engine may continue to operate at low rotational speed without causing propulsion of the vehicle (e.g., such as stationary idle conditions).

A first electric machine 20 operates as the electric propulsion source and is powered by a high-voltage traction battery 22. Generally, a high-voltage battery is one that has an operating voltage greater than 30 volts but less than 60 volts. In one example, the traction battery 22 is a lithium ion high-voltage battery with a nominal voltage of 48 volts. High-voltage direct current is conditioned by an inverter 24 before delivery to the first electric machine 20. The inverter 24 includes a number of switches and a control circuit which operate to convert the direct current into three-phase alternating current to drive the electric machine.

The first electric machine 20 has multiple operating modes depending on the direction of power flow. In a motor mode, power delivered from the high-voltage battery 22 allows the motor to output torque to shaft 26. The output torque may then be transferred through a variable ratio transmission 28 to change the gear ratio prior to delivery to a final drive mechanism 30. In one example the final drive mechanism 30 is a differential configured to distribute torque to one or more side shafts 32 which are coupled to wheels 34. The first electric machine 20 may be disposed either upstream of the transmission 28, downstream of the transmission 28, or integrated within a housing of the transmission 28.

The first electric machine 20 is also configured to operate in a generation mode to convert rotational motion into power to be stored at high-voltage battery 22. When the vehicle is moving, whether propelled by the engine or coasting from its own inertia, rotation of shaft 26 turns an armature, or rotor, (not shown) of the first electric machine 20. The motion causes an electromagnetic field to generate alternating current that is passed through the inverter 24 for conversion into direct current. The direct current may then be provided to the high-voltage battery 22 to replenish the charge stored at the battery. A unidirectional or bidirectional DC-DC converter 42 is used to charge a low-voltage (e.g., 12 volt) battery 44 and supply the low voltage loads 46 such as the conventional 12 volt loads. When a bidirectional DC-DC converter 42 is used, it is possible to jump start the high-voltage battery 22 from the low-voltage battery.

The various propulsion system components discussed herein may have one or more associated controllers to control and monitor operation. Controller 36, although schematically depicted as a single controller, may be implemented as one controller, or as system of controllers in cooperation to collectively manage the propulsion system. Multiple controllers may be in communication via a serial bus (e.g., Controller Area Network (CAN)) or via discrete conductors. The controller 36 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 36 may also store a number of algorithms or computer executable instructions needed to issue commands to perform actions according to the present disclosure.

The controller 36 is programmed to monitor and coordinate operation of the various propulsion system components. The controller 36 is in communication with the engine 12 and receives signals indicative of at least engine speed, temperature, as well as other engine operating conditions. The controller 36 is also in communication with the first electric machine 20 and receives signals indicative of motor speed, torque, and current draw. The controller may also be in communication with battery 22 and receive signals indicative of at least battery state of charge (SOC), temperature, and current draw. The control also receives signals indicative of the circuit voltage across the high-voltage bus. The controller 36 may further be in communication with one or more sensors at a driver input pedals 38 to receive signals indicative of pedal position which may reflect acceleration demand of the driver. The driver input pedal 38 may include an accelerator pedal and/or a brake pedal. In alternative embodiments such as a self-driving autonomous vehicle, acceleration demand may be determined by a computer either on-board or off-board of the vehicle without driver interaction.

As mentioned above, either one or both of the engine 12 and the first electric machine 20 may be operated at a particular time based at least on the propulsion requirements of the vehicle. During high torque demand conditions, the controller 36 may cause both of the engine 12 and the first electric machine 20 to be activated such that each provides an output torque which in combination propel the vehicle 10.

In certain moderate torque required conditions, the engine operates efficiently and may be used as the sole propulsion source. For example, during highway driving with a generally constant speed, the first electric machine 20 may be deactivated such that only the engine 12 provides output torque.

Under other example operating conditions, the engine 12 may be deactivated such that only the electric machine 20 provides output torque. The clutch 16 may be opened to decouple the shaft 14 from the downstream portions of the powertrain. Specifically, during vehicle coast conditions where a driver allows the vehicle to decelerate under its own resistance, the engine may be deactivated and the motor operated in generator mode to recover energy. Additionally, engine deactivation may be desirable during a temporary vehicle standstill such as at a traffic light. Instead of allowing the engine to idle, fuel consumption may be reduced by deactivating the engine while the vehicle is stationary. In both examples, it may be beneficial to rapidly restart the engine in response to a subsequent increase in propulsion demand. A prompt engine startup may avoid roughness and/or latency in power delivery being perceived by a driver.

Vehicle 10 includes a second electric machine 40 that is selectively coupled to the engine 12. The second electric machine 40 operates as a starter motor and when engaged with the engine leading up to a combustion cycle, and turns a crank portion of the engine to facilitate a cold start or a restart. The second electric machine 40 may be connected to a flywheel portion of the engine through a geared mechanical connection to pass torque to the crankshaft to start the engine. In another example, the second electric machine 40 may be connected to a crank pulley through a toothed belt mechanical connection to pass torque to the crankshaft of the engine. The controller 36 is programmed to issue a command to start the engine 12 using the second electric machine 40 in response to an acceleration demand following a period of reduced acceleration demand.

The second electric machine 40 is selectively engageable to the engine through a sliding pinion gear within an electric machine housing. A first solenoid may be disposed to actuate the pinion gear from a first disengaged position to a second position that is in mechanical connection with the engine crankshaft to transfer torque. As discussed above there may be different configurations of intermediate components to provide gear ratio adjustments and/or geometric adjustments due to powertrain package constraints. The first solenoid may receive a signal to engage the pinion gear once the electric machine is at a suitable speed for smooth torque transfer to start the engine.

When the engine is restarted, it may be restarted from substantially zero rotational speed, or from a speed which is significantly less than the rotational speed of the downstream powertrain components such as the first electric machine 20. The controller 36 may implement a delay following the initial restart of the engine 12 to allow engine speed to ramp up to be within a predetermined range of the system speed prior to closing the clutch 16. Reducing the difference between engine speed and speed of the downstream components improves the smoothness of the engagement of the clutch 16 and reduces NVH perceived by a passenger related to the engine restart event. However, this delay may lead to a perceivable lag in the delivery of additional propulsion torque required from the engine.

Some powertrain systems may include a brush contact type of starter motor coupled to the engine to provide the startup function. The starter motor is commonly powered by a low-voltage battery connected over a low-voltage bus. It may be powered by low-voltage battery 42 for example, or by a supplemental low-voltage power source. Conventional low-voltage batteries typically have a nominal voltage of about 12 volts and generally less than 18 volts. Low voltage loads 46 such as vehicle accessories are also commonly powered over the same low-voltage bus.

It may be undesirable to keep a brushed-contact starter motor connected to the power source on an ongoing basis. Therefore brushed-contact starter motor systems commonly include a second solenoid to actuate a mechanical connection to an electrical terminal to provide power. When it is desired to start the engine, the first solenoid and second solenoid must both be actuated. In many instances the actuation must be performed sequentially. For example, the second solenoid may be actuated to provide power to allow the starter motor to build up rotational speed. Then the first solenoid may be actuated to mechanically engage the starter motor output to the engine to facilitate the start event. Such a sequential actuation of multiple solenoids to operate the starter motor may contribute to an undesirable time delay for an engine restart.

When the engine is started, a temporary voltage drop is caused by the power load of the starter motor. A passenger may perceive certain symptoms such as lamp illumination levels dropping or temporary degraded function of other electrically-powered accessories due to the voltage drop. To avoid such undesirable symptoms, compensation means may be used but may have disadvantages. For example an additional DC-DC boost converter may be provided to temporarily step up the voltage to mask potential symptoms related to a voltage drop caused by the starter motor. Alternatively, a second power source may be provided to supplement the battery and compensate for a voltage drop. Each of the above examples of a voltage drop compensation means may increase cost, weight, and complexity of the propulsion system.

The brush contact type of motor may also be inherently limited in the time required to start the engine. Related to the construction of the brush contact motor, windings affixed to the rotor increase both the size and the mass of the rotor. The additional rotational inertia of the rotor may cause a higher duration of time to reach a desired rotational speed from rest. This adds to the duration of the engine restart and subsequently may limit the responsiveness of the propulsion system.

According to an aspect of the present disclosure, the second electric machine 40 is a brushless permanent magnet DC motor coupled to the engine 12 to provide a starting torque to restart the engine 12. The second electric machine 40 is powered by the high-voltage traction battery 22 over the high-voltage bus. The high-voltage operation of the second electric machine 40 provides rapid engine restarts that enable quick acceleration following engine deactivation during coasting for example.

Figure 2:
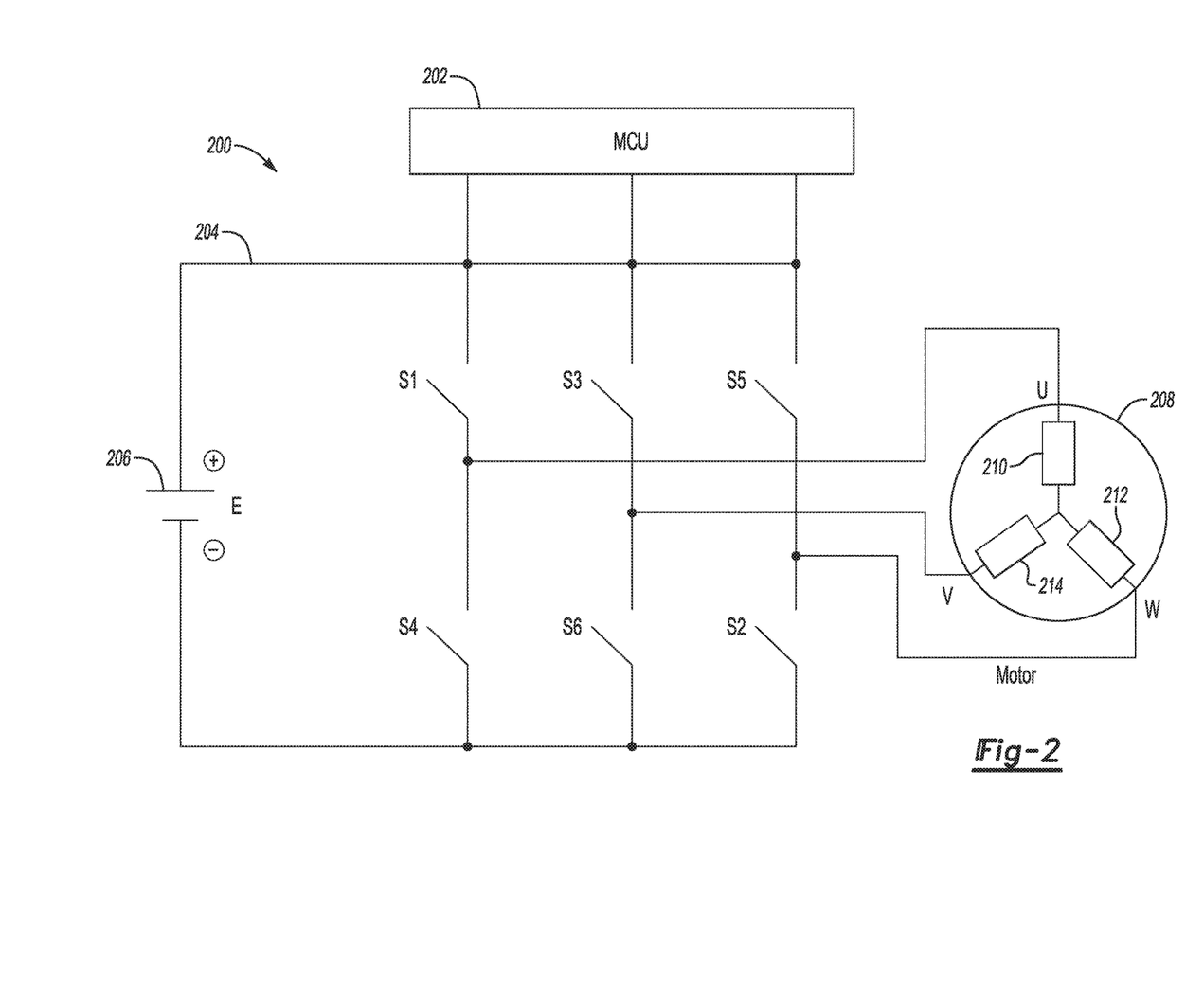
FIG. 2 is a partial circuit diagram of a switch set and driver for an electric machine.

Referring to FIG. 2, a schematic control circuit 200 is used to operate the starter electric machine. The control circuit is integrated into the electric machine 202 and includes a motor control unit 202 (MCU) which communicates with one or more controllers of the vehicle. The MCU stores one or more operation algorithms to operate the electric machine. Alternatively, a vehicle controller external to the electric machine may store control logic to issue commands to the MCU 202. A power stage portion 204 includes a plurality of solid-state switches (e.g., MOSFET, IGBT type transistors). In the example of FIG. 2, six switches (S1 trough S6) are independently and selectively connectable to high-voltage DC power source 206. The MCU provides gate signals to each of the switches to close the switches at a predetermined timing. When closed, a given switch passes current to one or more connections at motor 208.

Operation of the control circuit provides electronic commutation and converts DC current from the power source 206 into three-phase alternating current. Multiple stages of a commutation sequence are achieved by activating the switches S1-S6 in a sequence to create a rotating magnetic field within the electric machine 208. Based on selection of particular switches and the rate of actuation, the speed and the output torque of the electric machine 208 may be precisely controlled. In this way, a separate inverter may not be required to convert direct current from the high-voltage power source 206 into three-phase alternating current to drive the electric machine 208. The electric machine 208 may also include one or more internal sensors (e.g., Hall effect sensors) spaced about a stator to output signals indicative of the position and speed of a rotor of the electric machine 208. In the example of FIG. 2, three Hall effect sensors, HA 210, HB 212, and HC 214 are disposed on a stator portion of the electric machine 208 to detect position and movement of the rotor. The sensors 210, 212, and 214 are evenly spaced to be about 120 degrees apart in angle around the stator. Position feedback from the sensors may be used as input to the control logic stored at the MCU 202 to influence the actuation of the solid-state switches. The control logic may also include protection against undesirable motor conditions such as overcurrent, short-circuit, and thermal overheating. The integrated control circuit 200 may be also include instructions to execute a control action in response to detection of one or more error conditions of the electric machine.

The electric machine control strategy may utilize field-oriented control to achieve maximum torque per ampere and an extend range for output speed. The output speed of the shaft also serves as a feedback input into the control strategy. In addition to the speed loop, there also may be a current feedback loop that controls the electromagnetic torque produced by the machine. Advantages of field-oriented control include accurate speed control, good torque response, and full torque at near zero speed. However, field oriented control often requires expensive position sensors (such as a resolver), multiple current sensors and capacitors. Additionally, in order to drive the machine, a modulation technique must be used to control the inverter, which may require a powerful digital signal processor (DSP) to process the data and provide control outputs.

Since the electric machine is an interior permanent magnet machine, the maximum torque output occurs at a position where phase current is advanced relative to the back EMF profile. Adjusting the commutation timing by advancing the phase angle can improve the torque output. The phase advance angle is the angle (in electrical degrees) between the rotating magnetic field caused by excitation of stator windings and the rotating magnetic field due to the permanent magnets of the rotor. Generally, an additional motive force is created by enhancing the interaction between the rotating magnetic field and the permanent magnets of the rotor. It may be beneficial to determine an advance angle which provides maximum torque based on the particular electric machine characteristics. As a result, the electric machine is capable of producing more torque with less input current.

Additionally, by advancing the phase angle of the input current, it is possible to extend the maximum speed of the electric machine beyond nominally rated top speeds. Adjusting the phase angle will affect the speed of the motor as the each coil is energized earlier than the corresponding rise in back EMF.

According to aspects of the present disclosure control algorithms are provided to implement one or more of plurality of different control strategies which are selected based on the operating conditions of the electric machine. This multi-tiered control strategy can achieve high torque at low speeds, and extend high-power output at higher speeds using a simplified and low cost MCU 202. Further, the need for multiple capacitors is significantly reduced. Preferably, one capacitor is suitable to implement the control strategy. Additionally, a single current sensor may be used.

Figure 3:
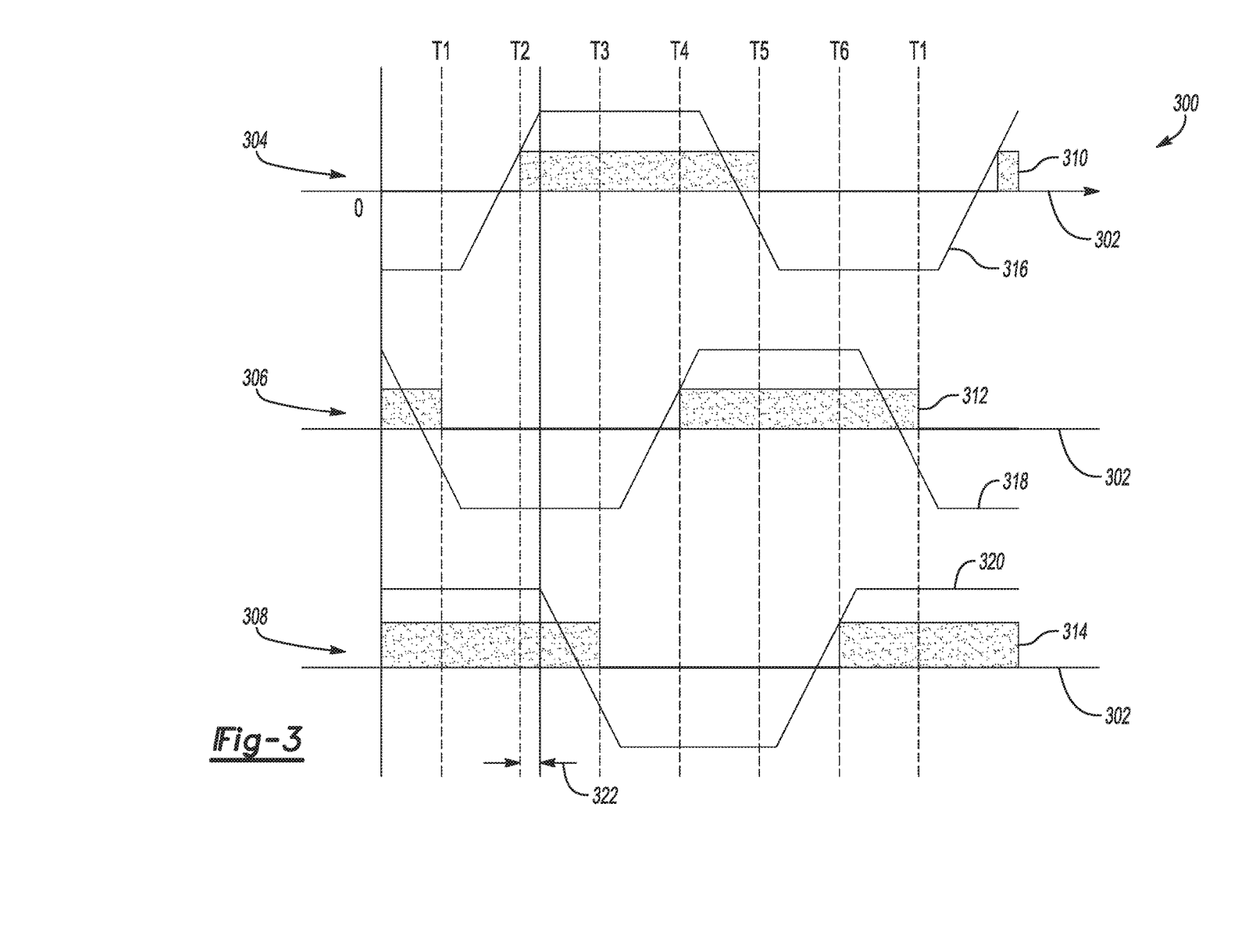
FIG. 3 is a plot of back EMF voltage and rotor position sensor outputs for an electric machine.

Output signals from the Hall sensors are used to sense rotor position and movement as opposed to utilizing a resolver. Referring to FIG. 3, plot 300 depicts concurrent profiles for each of three electrical phases of electric machine operation. The horizontal axis 302 for each profile is electrical angle. The angle repeats periodically, and is denoted by locations T1 through T6. Following T6, the cycle repeats beginning with T1. The profiles show the alignment between Hall sensor outputs and back EMF voltage. Upper profile 304 corresponds to phase A, the middle profile 306 corresponds to phase B, and lower profile 308 corresponds to phase C. Curve 310 represents output of Hall sensor HA 210, curve 312 represents output of Hall sensor HB 212, and curve 314 represents output of Hall sensor HC 314. Similarly, the back EMF is plotted for each phase—curve 316 represents phase A back EMF voltage, curve 318 represents phase B back EMF voltage, and curve 320 represents phase C back EMF voltage. Each Hall sensor output aligns with its corresponding phase back EMF voltage profile with predefined advance angle to provide maximum torque output. Generally, the optimal advance angle is between 10-20 electrical degrees. The actual advance angle may be measured by comparison of back EMF (phase to phase) timing with the Hall sensor timing. In the example of FIG. 3, a leading edge of Hall sensor HA output 310 (corresponding to location T2) is aligned with phase A back EMF voltage 316 with a phase advance angle 322 of 15 degrees. Each of phase B and phase C is synchronized with phase A and includes the same phase advance angle 322.

For various operational ranges phase angle 322 is applied, whereas certain other operating conditions may provide maximum output torque from the electric machine by utilizing an adjusted phase angle. According to aspects of the present disclosure, a control strategy includes selecting any of multiple available control algorithms based on speed.

A first control algorithm is applied while the output speed of the electric machine speed is less than a first speed threshold. In one example, the first control algorithm utilizes trapezoidal current control and a fixed predetermined phase advance angle to drive the electric machine. Since the electric machine is designed with some reluctance torque, the maximum torque occurs using around a 20 degree electrical advanced angle. At a low speed range (i.e., less than the first speed threshold), the input current is provided to the electric machine using trapezoidal current control and applying pulse width modulation (PWM) to at least one of the input currents. The controller is programmed to apply the first control algorithm while the output speed of the electric machine is less than the first speed threshold.

Table 1 below indicates an example switching schedule corresponding to the first control algorithm.

TABLE 1

| First Output Speed Range Trapezoidal Current Control | | | | | | |
|---|---|---|---|---|---|---|
| Section | T1-T2 | T2-T3 | T3-T4 | T4-T5 | T5-T6 | T6-T1 |
| Upper Switch | S5 PWM | S1 PWM | S1 PWM | S3 PWM | S3 PWM | S5 PWM |
| Lower Switch | S6 ON | S6 ON | S2 ON | S2 ON | S4 ON | S4 ON |

The locations T1 through T6 correspond to those electrical angles referenced in FIG. 3. Similarly, switch labels S1 though S6 correspond to those referenced in FIG. 2. During trapezoidal current control, at any time two switches conduct current, where only one switch is controlled by a PWM signal. By applying one PWM input signal and one input signal which remains on, the ripple due to PWM is significantly reduced such that a single capacitor may be capable of smoothing ripple voltage in the circuit.

Figure 4:
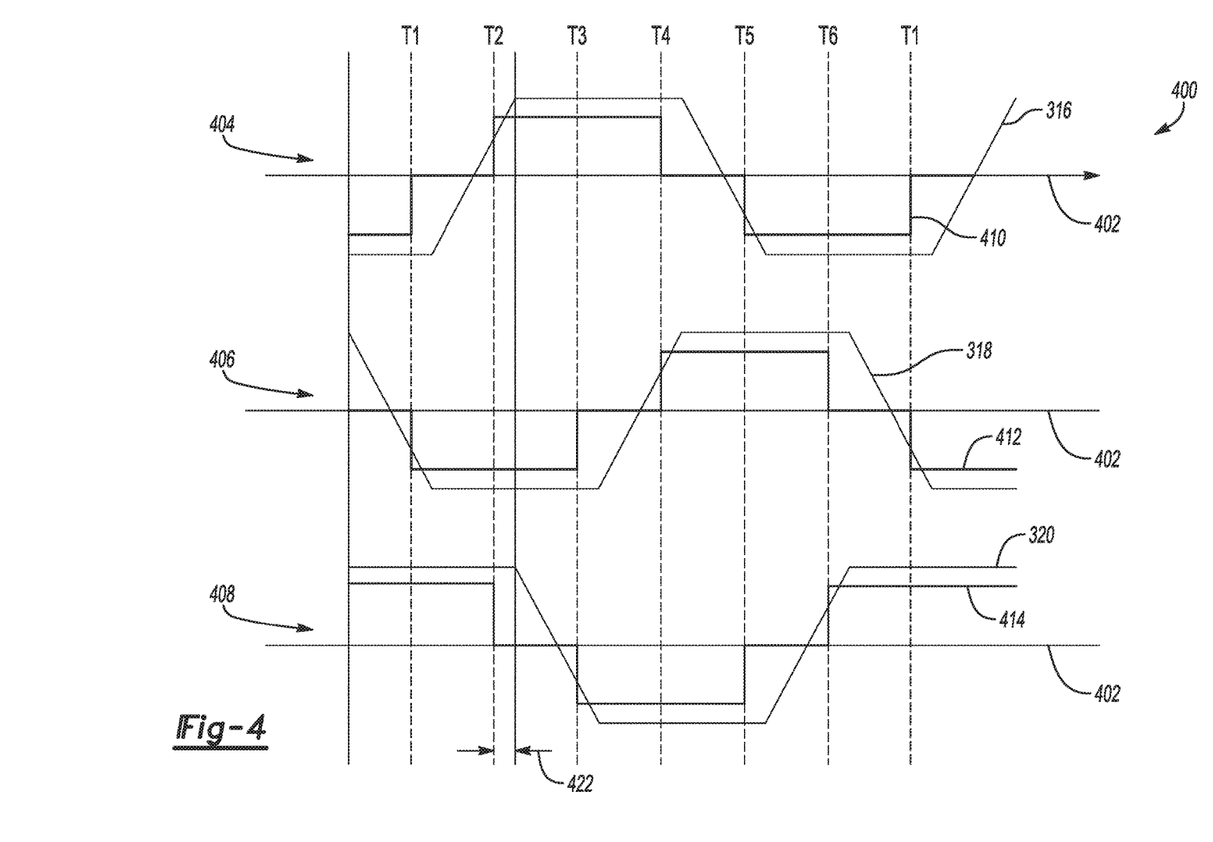
FIG. 4 is a plot of back EMF voltage and input current control for an electric machine according to a first control algorithm.

Referring to FIG. 4, plot 400 depicts concurrent profiles of the input current for each of the phase A, phase B and phase C resulting from the switching schedule described above. The horizontal axis 402 for each profile is electrical angle. The profiles show the alignment between input current provided by the switching schedule of Table 1 and back EMF voltage. Upper profile 404 corresponds to phase A, the middle profile 406 corresponds to phase B, and lower profile 408 corresponds to phase C. Curve 410 represents the phase A input current, curve 412 represents phase B input current, and curve 414 represents phase C input current. Similarly, the back EMF is plotted for each phase—curve 316 represents phase A back EMF voltage, curve 318 represents phase B back EMF voltage, and curve 320 represents phase C back EMF voltage. Advance angle 422 is applied to shift the input current profile ahead of the back EMF profiles to maximize torque output of the electric machine in the first output speed range.

At higher output speeds (i.e., greater than the first speed threshold) input voltage may become a more dominant constraint. It may be advantageous to apply a different control algorithm based on controlling voltage applied to the electric machine. An open loop voltage control algorithm may be applied while periodically adjusting the phase advance angle to achieve the optimal torque output of the electric machine. The first speed threshold may be based on an upper boundary of constant torque region of the electric machine. The torque output of the electric machine varies as a function of speed outside of the constant torque region, and the phase advance angle is optimized based on the speed and torque load of the electric machine. The controller is programmed to apply the second control algorithm while the output speed of the electric machine is greater than the first threshold speed. Table 2 below indicates an example switching schedule to implement the second control algorithm according to aspects of the present disclosure.

TABLE 2

Second Output Speed Range Six Step Voltage Control (Variable Phase Advance Angle)

| Section | 1 | 2 | 3 | 4 | 5 | 6 |
|---|---|---|---|---|---|---|
| Upper Switch | S5 & S1 ON | S1 ON | S1 & S3 ON | S3 ON | S3 & S5 ON | S5 PWM |
| Lower Switch | S6 ON | S6 & S2 ON | S2 ON | S2 & S4 ON | S4 ON | S4 & S6 ON |

During six step voltage control, at any time three switches conduct current and switches will be always on during each section. Pulse width modulation is not used for speeds greater than the first output speed range. Since there is no PWM signal, one bus capacitor is enough to minimize the effects of ripple voltage.

Figure 5:
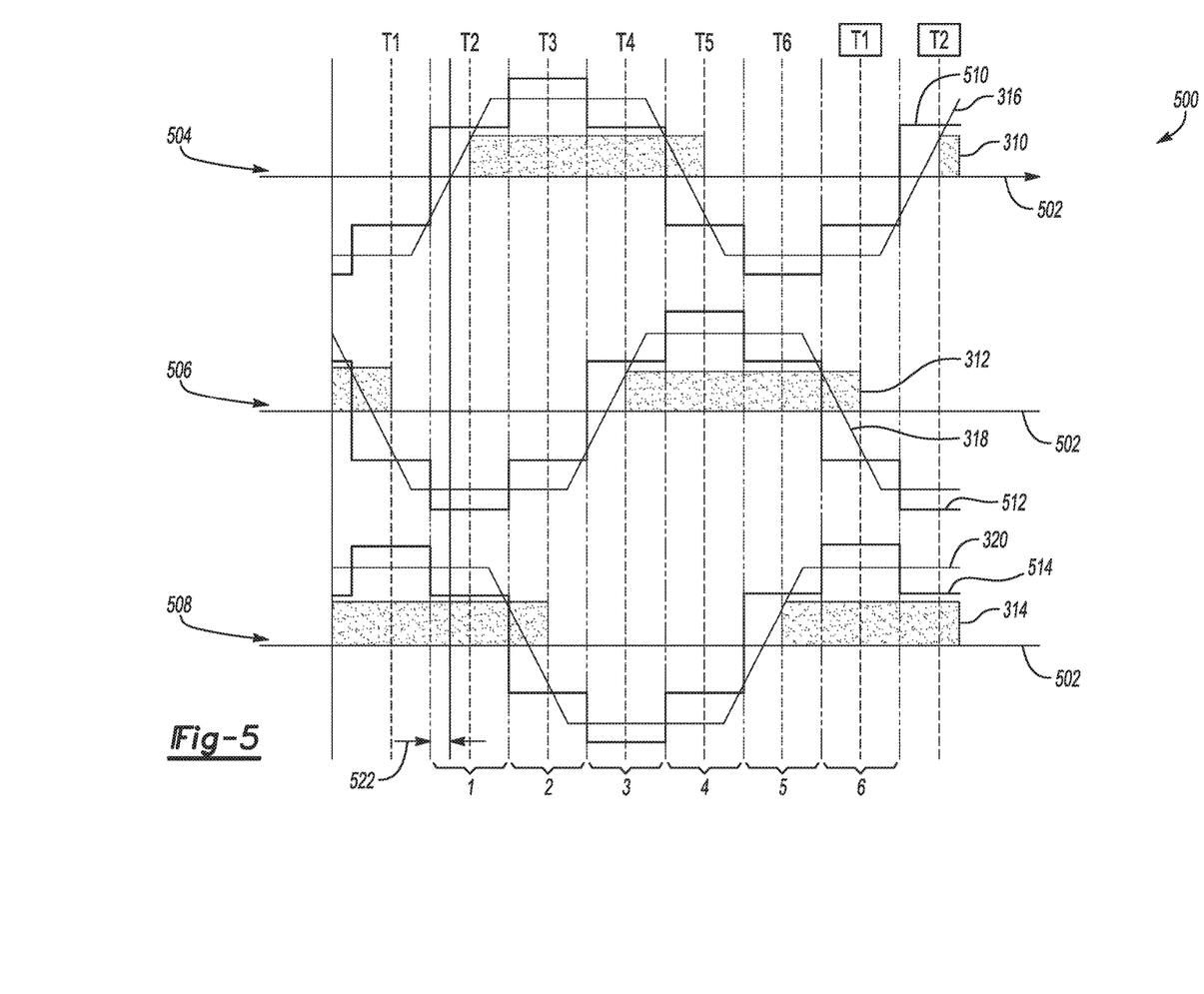
FIG. 5 is a plot of back EMF voltage and input voltage control for an electric machine according to a second control algorithm.

Referring to FIG. 5 as well as Table 2 above, the phase advance angle is optimized to align the six step voltage control input to maximize the torque output of the electric machine. Plot 500 depicts concurrent profiles of the phase voltage for each of the phase A, phase B and phase C resulting from the switching schedule described above. The profiles show the alignment between phase voltage created by the switching schedule of Table 2 and back EMF voltage. Upper profile 504 corresponds to phase A, the middle profile 506 corresponds to phase B, and lower profile 508 corresponds to phase C. Curve 310 represents output of Hall sensor HA 210, curve 312 represents output of Hall sensor HB 212, and curve 314 represents output of Hall sensor HC 314. Curve 510 represents the phase A voltage, curve 512 represents phase B voltage, and curve 414 represents phase C voltage. Similarly, the back EMF is plotted for each phase—curve 316 represents phase A back EMF voltage, curve 318 represents phase B back EMF voltage, and curve 320 represents phase C back EMF voltage.

The phase advance angle 522 applied is optimized to adjust the location of the phase voltage profiles relative to the back EMF profiles to maximize torque output of the electric machine in the second output speed range. The phase advance angle 522 is referenced from the zero crossing point 524 of the back EMF voltage as opposed to referencing from the leading edge of the signal from the Hall effect sensor. Section 1 through section 6 define the partitioned segments of the phase voltage caused by the activation of the corresponding switches as noted above in Table 2. The sections are shifted by the phase advance angle 522 to adjust the phase voltage timing to be offset from the timing increments of T1 through T6 discussed above in reference to the first control scheme.

According to aspects of the present disclosure, the advance phase angle 522 is periodically reassessed and then adjusted as needed based on the electric machine speed and torque requirements. The variable phase advance angle is adjusted based on at least an output speed requirement and an output torque requirement while operating the electric machine using the six-step voltage control algorithm. Since the second control algorithm is performed using open loop voltage control, computation time is short enough to execute the control loop even though the electric machine operates at very high speed. In this way, a relatively simple and inexpensive microcontroller may be used as the MCU.

Figure 6:
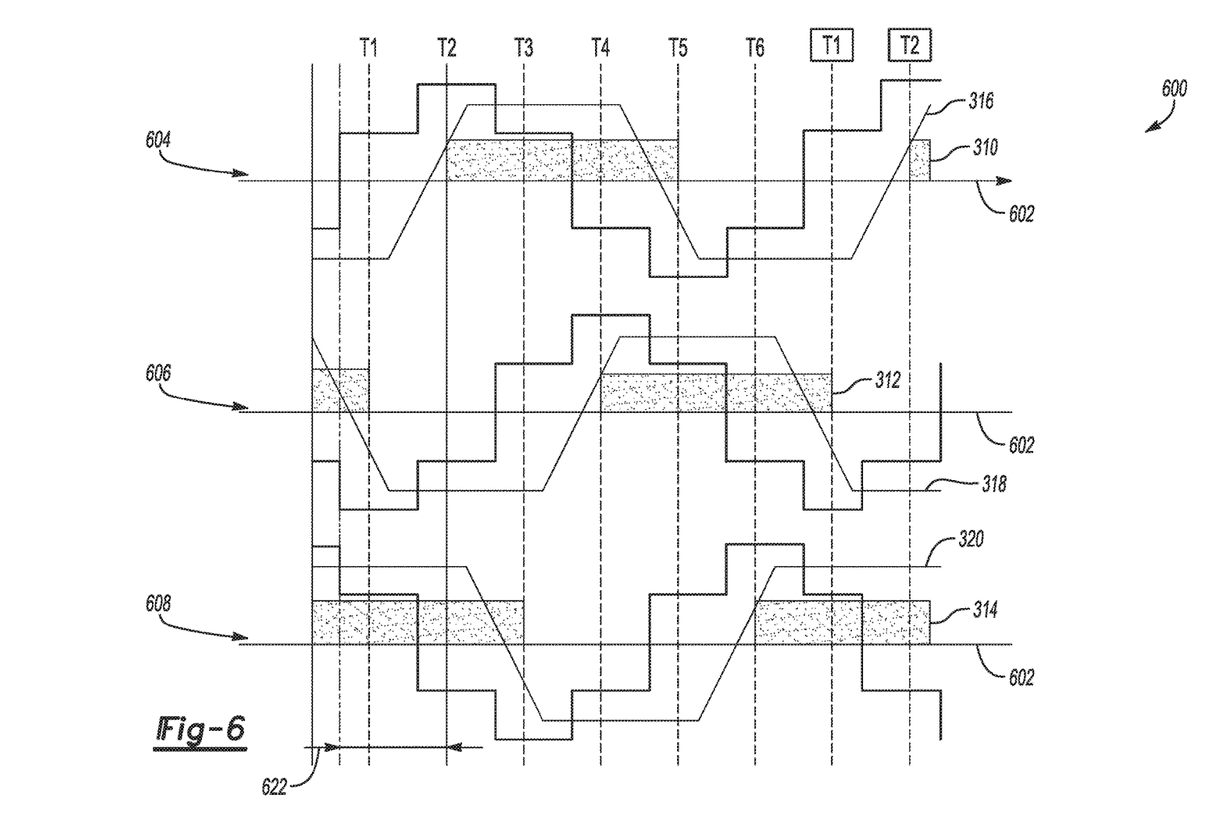
FIG. 6 is a plot of back EMF voltage and input voltage control for an electric machine according to a third control algorithm.

Referring to FIG. 6, a third control algorithm is applied while the output speed of the electric machine speed is greater than a second speed threshold. Once the electric machine output speed is greater than the second speed threshold, six step voltage control is still applied. However, since the electric machine is running at very high speed, a predetermined fixed phase advanced angle 622 is utilized. Curve 610 represents the phase A voltage, curve 612 represents phase B voltage, and curve 614 represents phase C voltage as a result of the fixed phase advance angle 622. Implementing a predetermined value as opposed to calculating the phase advance angle in real-time greatly reduces the computation time to ensure the control loop time. This fixed angle is equal to or slightly greater than the phase advance angle which results in the maximum torque at the maximum operating speed. The single predetermined phase angle shift may be employed to account for the range of conditions that may be present at the high operating speeds.

Figure 7:
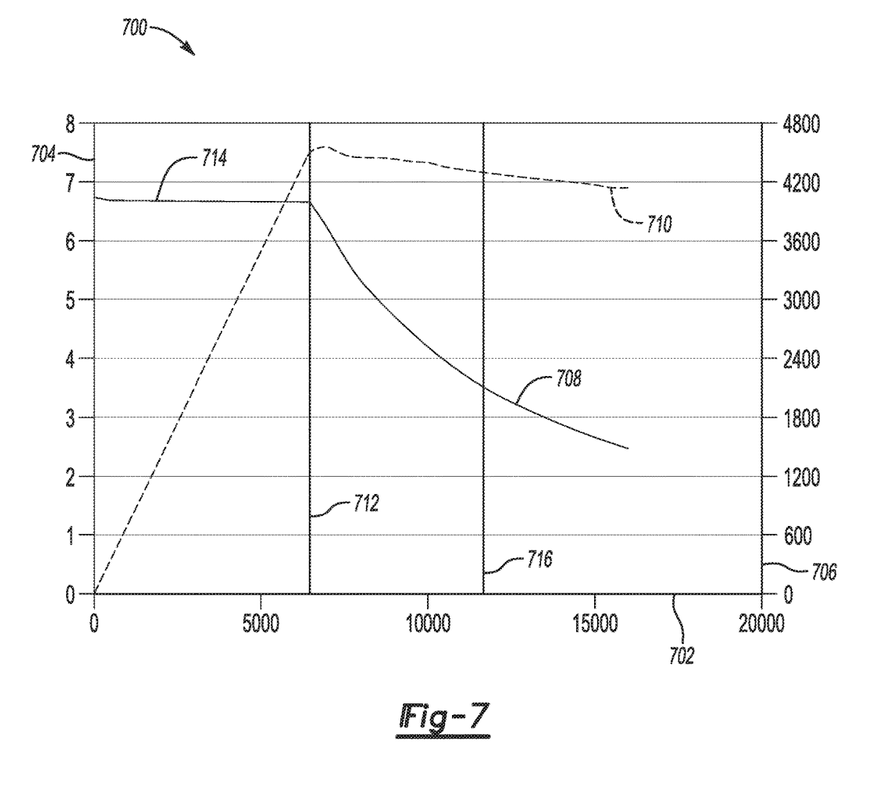
FIG. 7 is a plot of electric machine output.

Referring to FIG. 7 plot 700, a plot 700 depicts output of a brushless electric machine according to aspects of the present disclosure. Horizontal axis 702 represents rotational speed in rotations per minute (RPM). The left side vertical axis 704 represents output torque of the electric machine in Newton-meters (N-m). The right side vertical axis 706 represents output power of the electric machine in Watts. Each of torque and power are plotted for a brushless electric machine controlled according to certain parameters discussed above. Curve 708 represents output torque profile for the electric machine. Region 710 is a constant torque region of the electric machine. Between about 0 and 7000 RPM, the brushless electric machine configuration is capable of outputting relatively constant torque at about 6.7 N-m. A first speed threshold 712 may indicate an upper boundary of the constant torque region 710 of the electric machine. At output speeds greater than the first speed threshold 712, the torque output of the electric machine varies as a function of speed. Generally, the output torque of the brushless configuration represented by curve 708 provides torque output of about 2.5 N-m as high as 16,000 RPM.

Curve 710 represents an output power profile for a brushless electric machine controlled according to the present disclosure. The brushless electric machine configuration is capable of outputting maximum power at about the first speed threshold 712, for example around 4,500 Watts. A relatively small decrease in output power occurs at significantly higher speeds. For example the brushless electric machine is capable of delivering around 4,200 Watts output as high as 16,000 RPM.

As discussed above, the electric machine is operated using a first control algorithm while the output speed is in a first output speed range less than the first speed threshold 712. In one example the first control algorithm is a trapezoidal current control algorithm, and the first output speed range is a constant torque region of the electric machine.

Once output speed exceeds the first speed threshold 712, the electric machine is operated using a second control algorithm while the output speed in is a second output speed range between the first speed threshold 712 and a second speed threshold 716. In one example, the second control algorithm includes operating the second electric machine using six-step voltage control with a variable phase advance angle. The phase advance angle applied by the second control algorithm is determined based on optimizing torque output for the given speed and torque requirements.

The electric machine is operated using a third control algorithm while output speed exceeds the second speed threshold 716. In one example, the third control algorithm includes operating the second electric machine using six-step voltage control with a predetermined fixed phase advance angle. The fixed phase advance angle is stored in a memory of a controller and is used to reduce the computation time needed to operate the electric machine.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle propulsion system comprising:
    an engine and a first electric machine each configured to selectively provide torque to propel the vehicle;
    a second electric machine coupled to the engine and configured to start the engine from an inactive state; and
    a controller programmed to:
        execute a first control algorithm while output speed of the second electric machine is less than a first speed threshold,
        execute a second control algorithm while output speed of the second electric machine is greater than the first speed threshold and less than a second speed threshold,
        execute a third control algorithm while output speed of the second electric machine is greater than the second speed threshold,
        wherein the controller controls the second electric machine based on:
            the first control algorithm that includes operating the second electric machine using trapezoidal current control with pulse width modulation,
            the second control algorithm that includes operating the second electric machine using six-step voltage control with a variable phase advance angle, and
            the third control algorithm that includes operating the second electric machine using six-step voltage control with a predetermined fixed phase advance angle.

2. The vehicle propulsion system of claim 1 wherein the first speed threshold is based on an upper boundary of a constant torque region.

3. The vehicle propulsion system of claim 1 wherein the controller includes an integrated circuit having a plurality of solid-state switches configured to perform electronic commutation to convert direct current from the high-voltage battery into alternating current to drive the second electric machine.

4. The vehicle propulsion system of claim 3 wherein the first control algorithm includes selecting two switches from the plurality of solid-state switches such that a first of the two switches is closed to conduct current, and a second of the two switches is operated using pulse width modulation.

5. The vehicle propulsion system of claim 1 wherein the controller is integrated into a motor control unit of the second electric machine.

6. The vehicle propulsion system of claim 1 wherein the second electric machine includes a plurality of Hall effect sensors spaced about a stator to output signals indicative of a rotor position.

* * * * *